United States Patent [19]
Newill

[11] 3,767,949
[45] Oct. 23, 1973

[54] BEARING LUBRICATING SYSTEM
[75] Inventor: William J. Newill, Dayton, Ohio
[73] Assignee: General Motors Corporation, Detroit, Mich.
[22] Filed: June 28, 1972
[21] Appl. No.: 267,179

[52] U.S. Cl. ................................................. 310/90
[51] Int. Cl. ............................................. H02k 5/16
[58] Field of Search .......................... 310/90, 54, 58; 308/187; 184/13, 6.26

[56] References Cited
UNITED STATES PATENTS

| 2,709,567 | 5/1955 | Wood | 184/6.26 |
| 2,950,943 | 8/1960 | Forrest | 308/187 |
| 3,515,918 | 6/1970 | Otto | 310/90 |
| 3,075,106 | 1/1963 | Chi | 310/54 |
| 3,153,382 | 10/1964 | Blarcom, Jr. | 310/90 |
| 2,854,594 | 9/1958 | Philodovic | 310/90 |

Primary Examiner—R. Skudy
Attorney—W. E. Finken et al.

[57] ABSTRACT

In a preferred embodiment, this disclosure relates to a lubricating system for a bearing supporting the armature of a dynamoelectric machine. The lubricating system comprises a reservoir of lubricant which is adapted to be continuously replenished and a lubricant slinger or thrower which is supported adjacent one side of the bearing and upon the armature for rotation therewith. The reservoir has a portion of the bearing immersed therein when the machine is inactive to provide for the bearing to be lubricated when the machine is activated. The lubricant thrower is adapted to pass through the reservoir while the machine is continuously operating and centrifugally spray the lubricant to provide a mist of lubricant. The system further comprises a fan blade supported immediately adjacent the other side of the bearing and upon the armature shaft for rotation therewith. The fan blade serves to draw the mist of the lubricant through and about the bearing to provide lubrication of the bearing during continuous operation of the machine.

2 Claims, 3 Drawing Figures

PATENTED OCT 23 1973   3,767,949

BEARING LUBRICATING SYSTEM

The present invention relates to a lubricating system for an electrical machine, and more particularly to a dynamoelectric machine which has its armature bearings lubricated both for a wet oily start and during continuous operation of the machine.

Dynamoelectric machines have heretofore been provided with reservoirs of lubricant formed within the machine housings which serve to immerse the lower portion of the armature bearings in lubricant when the machine is inactive or continuously operating. For example, see U. S. Pat. Nos. 2,303,168; 2,579,039; and 3,298,760. Dynamoelectric machine have also heretofore been provided with bearing lubricating systems wherein a flow of lubricant is misted by a pressurized air source and forced to impinge upon the bearing. For example, see U. S. Pat. No. 2,986,433. Another lubricating system heretofore provided utilizes a ring rotating with the armature of the machine and passing through a first reservoir to provide a continuous supply of lubricant about a bearing and which serves to replenish a second reservoir serving in turn to immerse the lower portion of the bearing and lubricant. For example, see U. S. Pat. No. 2,335,557. In yet another lubrication system a lubricant slinger or thrower, which rotates with the armature shaft, passes through a reservoir in the housing of the machine and throws the lubricant centrifugally outward onto the housing of the machine and with the lubricant following a gravity path to lubricate the armature bearing. For example, see U. S. Pat. No. 3,051,533. Further, dynamoelectric machines have heretofore been provided with first reservoirs which immerse the armature bearings in a lubricant supply and which are continuously replenished during operation of the machine via a gravity feed of lubricant which is sprayed against the housing by a lubricant slinger passing through a second reservoir. For example, see U. S. Pat. No. 1,865,088. Lastly, a lubrication system for the bearings of a machine has been provided which comprises a combination lubrication slinger and fan which passes through a reservoir of lubricant and which sprays the lubricant and creates a lubricating mist which is blown by fan blades on the slinger to circulate the mist of lubricant about the bearing. For example, see U. S. Pat. No. 2,950,943.

Dynamoelectric machines have commonly used oil reservoirs with bearing parts immersed therein to provide for lubrication thereof. However, it is known that high speed operation of a dynamoelectric machine causes excessive pumping and stirring of the lubricant in a reservoir and results in heating of the bearing parts. For this reason many high speed dynamoelectric machines have jet spray systems which serve to lubricate and cool the bearing parts.

It is an object of the present invention to provide a new and improved lubricating system for the bearing parts of a dynamoelectric machine wherein a reservoir is employed to provide lubrication of the bearing parts at initial start up of the dynamoelectric machine, a slinger passes through the reservoir during operation of the dynamoelectric machine to spray and mist the lubricant in the reservoir and thus lower the level of lubricant therein to prevent excessive heating of bearing parts, and a fan draws the mist about the bearing parts to provide lubrication thereof during continuous high speed operation of the dynamoelectric machine.

An object of the present invention is to provide a new and improved lubricating system for an armature bearing of a dynamoelectric machine wherein a reservoir of lubricant is adapted to be continuously replenished and has a portion of the bearing immersed therein when the machine is inactive to provide for the bearing to be lubricated when the machine is activated, wherein a lubricant thrower is supported adjacent one side of the bearing and upon the armature shaft for rotation therewith and is adapted to pass through the reservoir while the machine is continuously operating to centrifugally spray the lubricant to provide a mist of lubricant, and wherein fan means is supported immediately adjacent the other side of the bearing and upon the armature for rotation therewith for drawing the mist of lubricant through and about the bearing to provide lubrication of the bearing during continuous operation of the machine.

Another object of the present invention is to provide a new and improved lubricating system for armature bearings as described in the immediately proceeding object and wherein a second reservoir above the first reservoir is adapted to collect lubricant during continuous operation of the machine and also includes a gravity feed means for continuously replenishing the first reservoir with lubricant.

These and other objects of the present invention are accomplished, in a preferred embodiment of the present invention, by providing a lubricant cooled dynamoelectric machine with an armature, bearings supporting the armature, and a bearing lubricating system. The bearing lubricating system includes a first reservoir of lubricating coolant which is adjacent the end of the armature shaft and which has the lower portion of the bearings immersed therein when the machine is inactive to provide for the bearings to be lubricated when the machine is activated. The system also includes a second reservoir located above the first reservoir and which is adapted to collect lubricating coolant during continuous operation of the machine. The second reservoir has a gravity feed means for continuously replenishing the first reservoir with lubricating coolant. An oil thrower is supported adjacent one side of the bearings and upon the armature shaft for rotation therewith. The oil thrower is adapted to pass through the first reservoir during continuous operation of the machine to centrifugally spray the lubricating coolant to provide a mist of lubricant. A fan blade is supported adjacent the other sides of the bearings and upon the armature shaft for rotation therewith and serves to draw the mist of lubricating coolant through and about the bearings to provide lubrication thereof during continuous operation of the machine.

These and other objects of the present invention will become more fully apparent from the following description and drawings wherein.

Figures 1, 2, 3:
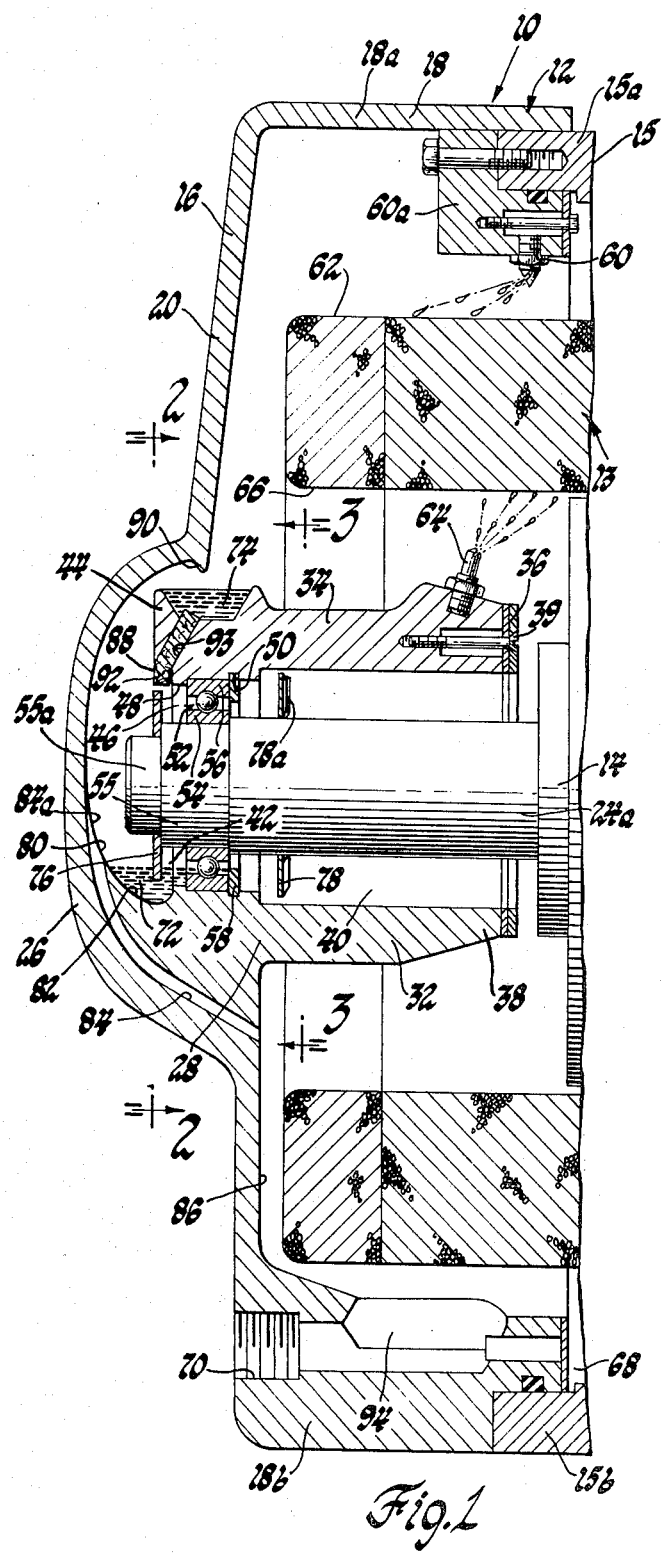
FIG. 1 is a fragmentary sectional view of a dynamoelectric machine embodying the lubricating system of the present invention.
FIG. 2 is a sectional view taken approximately along line 2—2 of FIG. 1.
FIG. 3 is a sectional view taken approximately along line 3—3 of FIG. 1.

As representing a preferred embodiment of the present invention, the drawing shows a dynamoelectric machine 10 which is generally of the high speed variety that is spray cooled, as is well known to those skilled in the art, and has a housing 12, a conventional, generally cylindrical and annular field core or stator 13, and a conventional armature or rotor 14 which is rotatably positioned within the stator 13. Because the construction of the opposite end portions of the dynamoelectric machine 10 are virtually identical, for the purposes of this application, the machine 10 is shown in fragmentary views and the structure of one end portion only will be described. The housing 12 comprises a first generally cylindrical and hollow member 15, only a portion of which is herein shown, and an end plate 16 which is generally dish-shaped and which has an axially extending outer wall portion 18 and a concave base 20 when viewed axially from within the machine 10. The end plate 16 is generally complementary in shape with the cylindrical member 15 of the housing 12 and is adapted to have the upper portion 18a of its outer wall 18 received outside or about the upper portion 15a of the cylindrical member 15. Further, the end plate 16 has the lower portion 18b of its outer wall 18 adapted to abut the lower portion 15b of the cylindrical member 15. It should also be understood that the end plate 16 and cylindrical member 14 of the housing 12 are adapted, in a manner not shown in the drawings, to be fixedly attached by conventional and suitable mechanical means. The base 20 of the end plate 16 has a central projecting portion 26 which bows outwardly from the end plate 16 and which, generally speaking, is rounded out.

The housing 12 includes a bearing support means 28 which is a cylindrical, annular two-piece member that extends axially from the base 20 of the end plate 16 toward the cylindrical member 15. The bearing support means 28 comprises a lower member 32 which is semicircular when viewed in cross section, as best shown in FIG. 3, and which is integral at its outer end, as best shown in FIG. 1, with the central projecting portion 26 of the end plate 16. The bearing support means 28 further comprises an upper member 34 which is also semicircular when viewed in cross section as is best shown in FIG. 3, and which is supported upon the lower member 32. The upper and lower members 32 and 34 are secured via circular and annular mounting plates 36, as shown in FIG. 1, which are adapted to abut the inner end 38 of the bearing support means 28 and to be fastened thereto with suitable mechanical means such as bolts 39, only one of which being shown herein.

When the lower and upper members 32 and 34 are secured as described above, the bearing support means 28 has a first opening 40 therein adjacent the inner end 38 of the bearing support means 28. The bearing support means 28 also has a second opening 42 of substantially the same diameter as the first opening 40 and which is located adjacent the outer end 44 of the bearing support means 28. Between the first and second openings 40 and 42, the bearing support means 28 defines a third opening 46 which is of lesser diameter than the first and second openings 40 and 42. The bearing support means 28 has a ridge or shoulder 48 which extends circumferentially about the third opening 46 and which projects radially inwardly thereof at a position adjacent the second opening 42. The third opening 46 also has a circumferentially extending groove 50 which projects radially outwardly therefrom into the lower and upper members 32 and 34 at an axially spaced location between the first opening 40 and the circumferential shoulder 48.

The armature shaft 24a of the machine 10 is rotatably supported within an anti-friction bearing assembly 52, which could be of any suitable and conventional variety but which is herein shown as a ball-type bearing. The bearing assembly 52 has its inner race 54 received and supported upon a reduced diameter first end portion 55 of the armature shaft 24a. It should be understood that the bearing assembly 52 is to be supported within the bearing support means 28 of the housing 12. In this respect, the bearing assembly 52 is positioned and supported within the third opening 46 of the bearing support means 28 which is substantially complementary in shape with the outer race 56 of the bearing 52. As shown in FIG. 1, the bearing assembly 52 is positioned within the third opening 46 with one side thereof in an abutting relationship with the circumferential shoulder 48 and is axially retained within the third opening 46 with a snap locking ring 58 which is positioned within the circumferential groove 50 in an abutting relationship with the other side of the bearing assembly 52.

As previously stated, the dynamoelectric machine 10 is of the high speed variety which inherently generates a significant amount of heat during its normal operation. In order to protect the machine 10 from damage from excessive heat build-up, during its normal operation, the machine 10 includes a coolant spray system. Although the present invention would be adaptable to dynamoelectric machines having different types of coolant spray systems, the coolant spray system is herein shown as comprising a plurality of first spray nozzles 60, only one of which is herein shown, which are supported upon fixtures 60a that are individually mounted, by suitable means, within the housing 12 at positions adjacent the upper outer periphery 62 of the stator 13 and which serve to direct a spray of lubricating coolant thereon. The coolant spray system further comprises a plurality of second spray nozzles 64 which are supported upon the upper member 34 of the bearing support means 28 adjacent the upper inner periphery 66 of the stator 13 and which serve to direct a spray of lubricating coolant thereon. Thus, it should be understood that the spray of lubricating coolant directly impinges the upper outer and upper inner peripheries 62 and 66 of the stator 13 and thereafter flows downwardly upon the stator 13 to cool all other peripheral portions thereof. Thereafter, the lubricating coolant collects in the lower portion of the housing 12 which serves as a sump 68. It should also be understood that the lubricating coolant is directed to the spray nozzles 60 and 62 under pressure via suitable conduit means (not shown) from a fluid pressure source (not shown) independent of the machine 10. The housing 12 has an outlet port 70 within the lower portion of the end plate 16, as shown in FIG. 1, which communicates with the bottom of the sump 68 in the housing 12 and which serves to provide for recirculation of the lubricating coolant to the fluid pressure source (not shown).

The bearing lubricating system of the present invention broadly comprises first and second reservoirs 72 and 74, respectively, a lubricant slinger or thrower 76, and a fan 78.

Referring to FIGS. 1 and 2, the first reservoir 72 is defined as a basin between the central projecting portion 26 of the end plate 16 and the bearing retaining means 28 and which serves to collect a supply of lubricating coolant, as will later be described in more detail.

The first reservoir 72 is actually defined between the inner wall 80 of the central projecting portion, the circumferential shoulder 48 of the integral lower member 32, and the inner race of the bearing assembly 52. Referring to FIG. 2, it can be seen that the first reservoir 72 has a rounded bottom 82 as defined by the inner wall 80 of the central projecting portion 26. It should be noted that an overflow passage or line 84 extends from a position in the inner wall 80 immediately adjacent the first reservoir 72 through the central projecting portion 26 to a location on the inner wall 86 of the end plate 16 somewhat below the first reservoir 72. It should also be noted that the bottom of the opening 84a of the overflow line 84 is slightly above the lowest portion of the outer race 56 of the bearing assembly 52 and, that, therefore, the lowest portion of the outer race 56 will be immersed in the lubricating coolant of the first reservoir 72 when at its highest level.

Still referring to FIG. 1, the second reservoir 74 is defined as a basin within the upper member 34 of the bearing support means 28 and is located immediately adjacent the outer end 80 of the bearing support means 28 and above the armature shaft 24a and first reservoir 72. Further, the second reservoir 74 is positioned immediately below a projection 90 between the inner wall 80 of the central projecting portion 26 and the inner wall 86 of the end plate 16. The second reservoir 74 serves to collect a supply of lubricating coolant, as will later be described in greater detail, and serves primarily to replenish the supply of lubricating coolant within the first reservoir 72 by virtue of a wick 92 which extends from within the second reservoir 74, downwardly through a passage 93 in the upper member 34 of the bearing support means 28, and which terminates at a position immediately above the armature shaft 24a and the first reservoir 72. In this respect, the lubricating coolant collected in the second reservoir 74 is continuously and gradually passed via the wick 92 and the force of gravity into the first reservoir 72.

The lubricant thrower 76, which is merely an annular disc, is supported upon a reduced diameter second end portion 55a of the armature shaft 24a for rotation therewith during operation of the machine 10. As shown in FIG. 1, the lower portion of the lubricant thrower 76 extends into the lubricating coolant collected within the first reservoir 72. During operation of the machine 10, the lubricant thrower 76 passes through the lubricating coolant of the first reservoir 72, collects a film of lubricating coolant thereon, and thereafter throws or sprays the lubricating coolant collected thereon in a centrifugal manner in order to provide a spray or mist of lubricating coolant between the inner wall 80 of the central projecting portion 26 and the outer end 88 of the bearing support means 28, and also to lower the level of lubricant in the first reservoir 72 during continuous high speed operation of the machine 10 to prevent excessive heating of the bearing assembly 52.

Referring to FIGS. 1 and 3, the fan 78 is circumferentially supported upon the armature shaft 24a in a manner for rotation therewith and within the first opening 40 of the bearing support means 28. Significantly, the fan 78 is positioned upon the opposite side of the bearing assembly 52 from the lubricant thrower 76. The fan 78 has a plurality of plates 78a thereon which serve to draw the mist of lubricant provided by the lubricant thrower 76 through and about the bearing assembly 52 in order to provide lubrication thereof during continuous operation of the machine 10.

During continuous operation of the machine 10, it should be seen that a portion of the lubricating spray directed against the upper outer periphery 62 of the stator 13 is deflected and collects upon the inner wall 86 of the end plate 16. The lubricating coolant so collected flows downwardly along the inner wall 86, drops from the projection 90, and collects within the second reservoir 74. As was previously described, the lubricating coolant collected within the second reservoir is continuously and gradually fed via the wick 92 into the first reservoir 72. Because the lubricant thrower 76 extends into lubricating coolant collected within the first reservoir 72, the lubricant thrower 76 passes therethrough during rotation of the armature shaft 24a, collects a thin film thereon which is sprayed centrifugally outward, and thereby provides a mist of lubricant between the inner wall 80 of the central projecting portion 26 and the outer end 88 of the bearing support means 28. The fan 78 serves to draw the mist of lubricant provided by the lubricant thrower 76 through and about the bearing assembly 52 to provide lubrication thereof during the continuous operation of the machine 10. When the machine is not operative it should be clear that the second reservoir 74 will tend to replenish the supply of lubricating coolant within the first reservoir 72. Because the bottom of the overflow line 84 is somewhat above the lowest portion of the outer race 56, the supply of lubricating coolant collected within the first reservoir 72 will attain a level above the lower portion of the outer race 56 and will thereby serve to lubricate the bearing assembly 52 for a wet oily start when the machine 10 is activated. It should also be apparent that any overflow from the first reservoir 72 will pass through the overflow passage 80 and along the inner wall 86 of the end plate 16 and enter the outlet port 70 via an aperture 94 in order to be recirculated to the fluid pressure source (not shown).

The foregoing disclosure relates to only one embodiment of the present invention which may be modified within the scope of the appended claims.

What is claimed is:

1. In a lubricant cooled dynamoelectric machine, the combination comprising: a rotatable armature shaft; a bearing assembly supporting the end of an armature shaft; and a bearing lubricating system including a first reservoir of lubricating coolant adjacent the end of the armature shaft and having the lower portion of the bearing assembly immersed therein when the machine is inactive to provide for the bearing assembly to be lubricated when the machine is activated, a second reservoir above said first reservoir and adapted to collect lubricating coolant during continuous operation of the machine, said second reservoir having gravity feed means for continuously replenishing said first reservoir with the lubricating coolant, an oil thrower supported adjacent one side of the bearing assembly and upon the armature shaft for rotation therewith and being adapted to pass through said first reservoir during continuous operation of the machine for centrifugally spraying the lubricating coolant to provide a mist of lubricating coolant, and a fan supported adjacent the other sides of the bearing assembly upon the armature shaft for rotation therewith and serving to draw the spray of lubricating coolant through and about the bearings to provide lubrication thereof during continuous operation of the machine.

2. In a dynamoelectric machine having a housing means having bearing support means; a pair of bearings each having outer races supported within said bearing support means; an armature shaft having its opposite ends journaled within and extending through said bearings; and bearing lubricating systems, the improvement being that said bearing lubricating systems have first reservoirs of lubricating coolant formed within said housing means immediately adjacent and below said opposite ends of said armature shaft and with the lower portion of said bearings being immersed therein when the machine is inactive so that said bearings are lubricated when the machine is activated, second reservoirs formed within said housing means immediately adjacent and above said opposite ends of said armature shaft and being adapted to collect lubricating coolant therein during operation of the machine, said second reservoirs having wicks providing for the lubricating fluid to continuously pass therefrom into said first reservoirs to replenish said first reservoirs, a lubricating coolant thrower supported adjacent one side of said bearing and upon the end of said armature shaft for rotation therewith and being adapted to pass through said first reservoir when the machine is activated to centrifugally spray the lubricating fluid to provide a mist of lubricating fluid, and a fan supported adjacent the other side of said bearing and upon said armature shaft for rotation therewith, said fan serving to draw said mist of lubricating coolant through and about said bearing to lubricate the same during operation of the machine.

* * * * *